(12) United States Patent
Ziegler et al.

(10) Patent No.: US 8,236,430 B2
(45) Date of Patent: Aug. 7, 2012

(54) COMPOSITE BODIES, METHOD FOR THE PRODUCTION THEREOF AND USE THEREOF

(75) Inventors: Ursula Ziegler, Mainz (DE); Frank Reil, Seeheim-Jugenheim (DE); Klaus Kurz, Kelsterbach (DE)

(73) Assignee: TICONA GmbH, Sulzbach (DE)

( * ) Notice: Subject to any disclaimer, the term of this patent is extended or adjusted under 35 U.S.C. 154(b) by 289 days.

(21) Appl. No.: 10/584,745

(22) PCT Filed: Dec. 22, 2004

(86) PCT No.: PCT/EP2004/014563
§ 371 (c)(1),
(2), (4) Date: Jul. 10, 2006

(87) PCT Pub. No.: WO2005/065943
PCT Pub. Date: Jul. 21, 2005

(65) Prior Publication Data
US 2007/0154727 A1 Jul. 5, 2007

(30) Foreign Application Priority Data

Dec. 24, 2003 (DE) .................................. 103 61 190

(51) Int. Cl.
*B32B 27/08* (2006.01)
*B29B 13/02* (2006.01)
*C08G 2/08* (2006.01)

(52) U.S. Cl. ............. 428/474.4; 264/328.1; 264/328.16; 264/331.22; 528/270

(58) Field of Classification Search ............... 428/474.4; 264/328.1, 328.16, 331.22; 528/270
See application file for complete search history.

(56) References Cited

U.S. PATENT DOCUMENTS

| | | | |
|---|---|---|---|
| 4,376,856 A * | 3/1983 | Tanaka et al. .................. | 528/292 |
| 4,536,563 A * | 8/1985 | Okitsu et al. .................. | 528/279 |
| 5,002,625 A | 3/1991 | Naritomi et al. | |
| 5,451,624 A * | 9/1995 | Memon et al. ................. | 524/151 |
| 5,792,532 A * | 8/1998 | Pfleger ......................... | 428/36.9 |
| 6,044,963 A | 4/2000 | Lerch et al. | |
| 6,444,065 B1 | 9/2002 | Reil et al. | |
| 6,512,047 B2 * | 1/2003 | Kim et al. ..................... | 525/66 |
| 6,517,949 B1 * | 2/2003 | Mutsuda ....................... | 428/501 |
| 6,746,757 B1 * | 6/2004 | Takagi et al. .................. | 428/213 |
| 2003/0183810 A1 | 10/2003 | Fujihana et al. | |
| 2004/0118509 A1 * | 6/2004 | Flexman et al. ............... | 156/242 |
| 2004/0121175 A1 * | 6/2004 | Flexman et al. ............... | 428/515 |

FOREIGN PATENT DOCUMENTS

| | | |
|---|---|---|
| DE | 3832295 | 3/1989 |
| DE | 3939864 A1 | 6/1991 |
| DE | 4304751 A1 | 8/1994 |
| DE | 10017486 A1 | 10/2001 |
| EP | 0818294 A1 | 1/1998 |
| GB | 2 221 685 | 2/1990 |
| JP | 08-323890 | 12/1996 |
| JP | 08323890 | 12/1996 |
| JP | 11254584 | 9/1999 |
| JP | 2001518403 | 10/2001 |
| JP | 2003001761 | 1/2003 |
| JP | 2003-220667 | 8/2003 |
| JP | 2003-261688 | 9/2003 |
| JP | 2003260721 | 9/2003 |
| WO | WO-99/30913 A1 | 6/1999 |
| WO | WO 00/20204 | 4/2000 |

OTHER PUBLICATIONS

Machine translation of WO 00/20204 (2000).*
ARKEMA brochure. PEBAX® Application Areas. Jun. 2000.*
ARKEMA brochure. PEBAX® Polyether Block Amides Technical Data. Aug. 2003.*
Stuttgart, "Ergebnisse Und Leistungen 1999, Online! 2000," pp. 1-26 (XP002321884).
Neue-Hart-Welch-Verbunde aus POM und TPU Zweikomponenten-Spritzgiessen, Kunststoffe, Carl Hansre Verlag, Munchen, DE, No. 11, Nov. 2003, XP001156982, ISSN 0023-5563, p. 81, table 1.

* cited by examiner

*Primary Examiner* — Callie Shosho
*Assistant Examiner* — John Freeman
(74) *Attorney, Agent, or Firm* — Dority & Manning, P.A.

(57) ABSTRACT

Composites are described, comprising polyacetal and at least one thermoplastic polyamide elastomer formed by a polyacetal molding which has been partially or completely coated with the thermoplastic polyamide elastomer or onto which one or more moldings composed of the thermoplastic polyamide elastomer have been directly molded. The composites are characterized in that the polyacetal and the thermoplastic polyamide elastomer have been bonded adhesively or cohesively to one another via injection of the polyamide elastomer onto the polyacetal molding, and in that the tensile bond strength between the polyacetal and the thermoplastic polyamide elastomer is at least 0.5 N/mm². The composites may be used as connectors, as functional components with integrated sealing properties and/or with integrated damping properties, or else as non-slip and easy-grip elements.

10 Claims, No Drawings

COMPOSITE BODIES, METHOD FOR THE PRODUCTION THEREOF AND USE THEREOF

RELATED APPLICATIONS

This application is a national stage application (under 35 U.S.C. 371) of PCT/EP2004/014563 filed Dec. 22, 2004, which claims benefit to German application 103 61 190.8 filed Dec. 24, 2003.

The present invention relates to composites composed of a combination of the engineering material polyoxymethylene with functional elements directly molded-on and composed of one or more thermoplastic polyamide elastomers (TPEA), to their production, and also to their use.

The engineering material polyacetal, i.e. polyoxymethylene (also termed POM or polyacetal below) has excellent mechanical properties and is moreover generally also resistant toward all of the usual solvents and fuels. Moldings composed of polyoxymethylene are therefore used inter alia in automobile construction, and in particular even in fuel-conveying systems.

Moldings composed of polyacetal are very often used in all sectors of everyday life for snap connectors, in particular clips, because of good strength and hardness combined with excellent rebound resilience.

Excellent sliding friction properties are the reason for use of polyoxymethylene for many moveable parts, e.g. gearbox parts, deflector rolls, gearwheels, or shift levers. Housings and keyboards are also produced from polyoxymethylene, the reason being very good mechanical resistance and chemicals resistance.

However, POM has a low mechanical damping factor at room temperature, and in some applications this necessitates use of soft damping elements. When moldings composed of polyoxymethylene are installed, connection sites also often require a seal. The high surface hardness of moldings composed of POM, and the low coefficient of sliding friction of POM, can lead to slip of superposed articles and can create risk in the operation of switching units and control units composed of POM.

On the other hand, it is true that combinations composed of hard and soft materials are used with increasing frequency, in order to achieve a mutual combination of the particular properties of these materials. The hard material here is intended to give the components their strength, and because the soft material has elastic properties it assumes functions related to sealing or vibration-damping and sound-deadening, or brings about a change in surface feel.

In these applications it is important that there is sufficient adhesion between the hard component and the soft component.

One of the methods used hitherto provides gaskets and damping elements separately and usually uses an additional operation for their mechanical anchoring or adhesive-bonding, thus generating additional work and sometimes considerable additional costs. A more modern and more cost-effective method is multicomponent injection molding. In this, by way of example, a second component is molded onto a previously molded first component. The adhesion achievable between the two components is of great importance for this process. Although this adhesion in multicomponent injection molding can often be further improved via introduction of undercuts within interlocking connections, good underlying adhesion via chemical affinity between the selected components is often a precondition for their use.

Examples of well-known combinations produced by multicomponent injection molding are composed of polypropylene (PP) and of polyolefin elastomers or of styrene/olefin elastomers, polybutylene terephthalate (PBT) with polyester elastomers or with styrene/olefin elastomers. Polyamides, too, adhere to many soft components.

Thermoplastic elastomers are said to be in principle capable of combination with thermoplastics in the overmolding, by way of example polyurethane elastomers (TPEU) adhering to POM (Kunststoffe 84 (1994) p. 709 and Kunststoffe 86, (1996), p. 319). Those publications give no adhesion for the combination of POM with TPEA (polyamide elastomer). According to those overview articles, therefore, an adhesive bond derived from POM and TPEA is hitherto unknown.

EP-A-818,294 describes axles or rollers with a specific design and comprising bonding combinations composed of a first and second thermoplastic material. Possible materials listed are, inter alia, POM and thermoplastic elastomers based on polyether block amides. The bonding can be produced via adhesive, cohesive, or mechanical bonding. There are no specific examples listed for adhesive or cohesive POM/TPEA bonding. Because the production of bonding of this type is problematic, the absence of some specific examples thereof has to be taken as implying that that specification discloses no adhesive or cohesive POM/TPEA bonding.

EP-A-816,043 discloses materials combinations composed of hard thermoplastics, such as POM, and of soft thermoplastics. That document gives no indication of an adhesive bond between POM and thermoplastic polyamide elastomers.

Materials combinations described in WO-A-99/16,605 comprise POM/thermoplastic polyurethane elastomer. Again, there is no mention of thermoplastic polyamide elastomers.

U.S. Pat. No. 6,082,780 discloses pipes around which thermoplastic or elastomer has been injected. A very wide variety of polymers is disclosed for the pipe and, respectively, for the sheath. POM and thermoplastic polyamide elastomers are listed, inter alia as material for the pipe and/or the sleeve. Alongside a large number of polymer combinations that can give adhesive bonding systems between the materials, that document also discloses numerous combinations which do not give adhesion. Because the production of bonding between POM and thermoplastic elastomers is problematic, the absence of some specific examples thereof has to be taken as implying that that specification discloses no adhesive POM/TPEA bonding.

WO 99/30,913 describes rotatable plastics rollers. That document discloses thermoplastic polyamide elastomers, but does not disclose combinations of these with polyoxymethylene.

DE-A-4,109,936 describes interior door handles. That document mentions, inter alia, polyoxymethylene as "hard plastic" and, inter alia, thermoplastic polyamide elastomers as "soft plastic". That document cannot be deemed to suggest the combination of polyoxymethylene with polyamide elastomers or their adhesive or cohesive bonding, since there are other elastomer types listed which do not enter into adhesive bonding with the "hard plastics" listed.

The prior art describes combinations of a very wide variety of hard and soft components (cf. DE 43 04 751 A1, DE 39 39 864 A1, DE 100 17 486 A1, JP 08/323,890, WO 99/30913 A1, and EP 0 818 294 A1). Although those documents list polyacetal and polyamide elastomer respectively within the list of a wide variety of possible hard and soft components, if the hard and soft components respectively listed are randomly combined the general result in the absence of particular process-technology measures, or in quite a few cases, will be absolutely no adhesive bonding between hard component and soft component.

It is an object of the present invention to provide novel composites which feature high bond strengths and which are composed of polyacetal with directly-molded-on functional elements composed of polyamide elastomers by multicomponent injection molding.

Another object of the present invention consists in the provision of a process which can produce composites which have high bond strengths and which are composed of polyacetal with directly-molded-on functional elements composed of polyamide elastomers.

The present invention provides a composite comprising polyacetal and at least one thermoplastic polyamide elastomer formed by a polyacetal molding which has been partially or completely coated with the thermoplastic polyamide elastomer or onto which one or more moldings composed of the thermoplastic polyamide elastomer have been directly molded, where the polyacetal and the thermoplastic polyamide elastomer have been bonded adhesively or cohesively to one another via injection of the thermoplastic polyamide elastomer onto the polyacetal molding, and where the tensile bond strength between the polyacetal and the thermoplastic polyamide elastomer is at least 0.5 N/mm².

The tensile bond strength present in the inventive composite or, respectively, achieved via the process of the invention between polyacetal and thermoplastic polyamide elastomer is at least 0.5 N/mm², preferably at least 1.0 N/mm². This provides fully satisfactory handling. For functional parts greater adhesion is desirable—as a function of exposure to stress.

Any desired polyacetal, and indeed any of those selected from the group of the known polyoxymethylenes as described by way of example in DE-A 29 47 490, can be used as polyacetal used in the inventive composite. The materials here are generally unbranched linear polymers which generally contain at least 80 mol %, preferably at least 90 mol %, of oxymethylene units (—CH₂—O—). The term polyoxymethylenes here encompasses not only homopolymers of formaldehyde or its cyclic oligomers, such as trioxane or tetroxane, but also corresponding copolymers.

Homopolymers of formaldehyde or of trioxane are polymers whose hydroxy end groups have been chemically stabilized in a known manner with respect to degradation, e.g. via esterification or etherification.

Copolymers are polymers composed of formaldehyde or of its cyclic oligomers, in particular trioxane, and of cyclic ethers, of cyclic acetals and/or of linear polyacetals.

Comonomers that can be used are i) cyclic ethers having 3, 4, or 5, preferably 3, ring members, ii) cyclic acetals other than trioxane having from 5 to 11, preferably 5, 6, 7, or 8, ring members, and iii) linear polyacetals, amounts used in each case being from 0.1 to 20 mol %, preferably from 0.5 to 10 mol %.

The melt index (MFR value, 190/2.16) of the polyacetal polymers used is generally from 0.5 to 75 g/10 min (ISO 1133). It is also possible to use modified grades of POM in which, by way of example, impact modifiers, reinforcing materials, such as glass fibers, or other additives are present.

Among these modified POM grades are, by way of example, blends composed of POM with TPEU (thermoplastic polyurethane elastomer), with MBS (methyl methacrylate-butadiene-styrene core-shell elastomer), with methyl methacrylate-acrylate core-shell elastomer, with PC (polycarbonate), with SAN (styrene-acrylonitrile copolymer), or with ASA (acrylate-styrene-acrylonitrile copolymer compounded material).

The thermoplastic polyamide elastomers (TPEA) used comprise multiblock copolymers which are composed of stiff polyamide segments and of flexible long-chain polyether or polyester segments.

TPEA are known per se. Examples of these are described in PERP Report "Thermoplastic Copolyester and Copolyamide Elastomers" 02/03S9; Nexant Chem Systems, pp. 2-3 and 5-7 (October 2003); Ullmann's Encyclopedia of Industrial Chemistry, 6th edition, 2002, keyword: Thermoplastische Elastomere [Thermoplastic Elastomers]; Elf Atochem S.A., Technical brochure on Pebax grades, Paris—La Défense, 1994; Ube Industries, Technical brochure on Ube Polyamide Elastomer, Tokyo, September 1993, or Chemische Werke Hüls, Technical brochure on Vestamid grades, Marl, 1990.

Preferred thermoplastic polyamide elastomers are copolyamides containing the repeat structural units of the formulae I and II or of the formulae I and III or of the formulae I, II, and III, which have been linked to one another via ester bonds and/or amide bonds

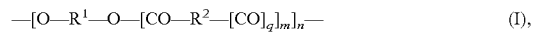

$$—[O—R^1—O—[CO—R^2—[CO]_q]_m]_n— \quad (I),$$

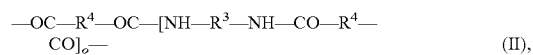

$$—OC—R^4—OC—[NH—R^3—NH—CO—R^4—CO]_o— \quad (II),$$

$$[—NH—R^5—CO]_p— \quad (III),$$

where R¹, R², and R³, independently of one another, are alkylene or cycloalkylene radicals, where R⁴ and R⁵, independently of one another, are alkylene, cycloalkylene, or arylene radicals, m and q, independently of one another, are 0 or 1, and n, o, and p, independently of one another, are whole numbers at least equal to 1.

The preferred thermoplastic copolyamide elastomers are in essence composed of the repeat aliphatic or cycloaliphatic ether or ester units described above of the formula I and of the repeat amide units of the formula II and/or of the formula III.

The repeat structural units of the formula I are aliphatic or cycloaliphatic polyether units or aliphatic or cycloaliphatic polyester units.

The polyether units of the formula I can be obtained via condensation or polymerization of the corresponding aliphatic or cycloaliphatic diols or of their polyether-forming derivatives in a manner known per se.

To prepare the elastomeric polyetheramides used inventively, hydroxy-terminated polyethers or amino-terminated polyesters can be used.

The polyester units of the formula I can be obtained via condensation of the corresponding aliphatic or cycloaliphatic diols with a dicarboxylic acid or with an ester-forming derivative thereof, or via polymerization of an aliphatic or cycloaliphatic lactone.

The number-average molecular weight of suitable polyethers or polyesters for forming the structural units of the formula I is from 100 to 4000, and their melting point (DSC) is below 55° C.

Preferred polyether units of the formula I derive from poly(alkylene oxide)glycols, where the alkylene moiety has from two to eight carbon atoms, for example from poly(ethylene oxide)glycol, poly(propylene 1,2- and 1,3-oxide)glycol, poly(tetramethylene oxide)glycol, poly(pentamethylene oxide)glycol, poly(octamethylene oxide)glycol, and poly(butylene 1,2-oxide)glycol; from random or block copolymers of ethylene oxide with propylene 1,2-oxide; or from polyformals obtainable via reaction of formaldehyde with glycols, such as pentamethylene glycol, or from mixtures of glycols, for example from mixtures composed of tetramethylene glycol and pentamethylene glycol, or, in place of the abovementioned glycols, from the corresponding derivatives terminated by amino groups.

Other preferred repeat structural units of the formula I are aliphatic polyesters, e.g. polybutylene adipate, polybutylene succinate, or poly-caprolactone.

Yet other suitable repeat structural units of the formula I derive from polybutadiene glycols or from polyisoprene glycols, or else from copolymers composed of these units and the corresponding hydrogenated derivatives of these glycols.

Polyether units of the formula I that are used with particular preference derive from poly(tetramethylene oxide)glycols whose number-average molecular weight is from 600 to 2000 and from ethylene-oxide-capped poly(propylene oxide)glycol whose number-average molecular weight is from 1500 to 2800 and which contains from 15 to 35% of ethylene oxide, or else from the corresponding derivatives terminated by amino groups.

The short-chain amide units of the formula II or III are reaction products of aliphatic or cycloaliphatic diamines of low molecular weight with a dicarboxylic acid or with a mixture of dicarboxylic acids, or of aliphatic or cycloaliphatic lactames or of the corresponding omega-amino carboxylic acids of low molecular weight.

In one preferred embodiment, most of the short-chain amide units, preferably 100 mol % thereof, have radicals $R^5$ derived from aliphatic lactames having from four to twelve carbon atoms, or from the corresponding omega-aminocarboxylic acids, in particular from caprolactam or from laurolactam, or from aminoundecanoic acid.

In another preferred embodiment, most of the short-chain amide units, preferably 100 mol % thereof, have radicals $R^4$ derived from aliphatic or cycloaliphatic dicarboxylic acids, such as adipic acid, tartaric acid, or sebacic acid, and have radicals $R^3$ derived from aliphatic or cycloaliphatic diamines of low molecular weight.

Aliphatic or cycloaliphatic diamines with low molecular weights are (cyclo)aliphatic diamines whose molecular weights are less than 250.

It is preferable to use aliphatic or cycloaliphatic diamines having from two to fifteen carbon atoms. Examples of preferred diamines are ethylene-, propylene-, tetramethylene-, pentamethylene-, 2,2-dimethyltrimethylene-, hexamethylene-, and decamethylenediamine, diaminocyclohexane, and mixtures of these.

For the purposes of this invention, "(cyclo)aliphatic lactames" are compounds which have at least one mutually condensed carboxy and amino group which have been bonded to different carbon atoms of a (cyclo)aliphatic hydrocarbon, thus forming a ring system. It is preferable to use aliphatic lactames having from four to twelve carbon atoms which form ring systems having from five to thirteen ring carbon and ring nitrogen atoms. These are mainly radicals derived from saturated aliphatic hydrocarbons.

For the purposes of this invention, "(cyclo)aliphatic omega-aminocarboxylic acids" are compounds which have at least one terminal amino group and at least one terminal carboxy group, these having been bonded to different carbon atoms of a (cyclo)aliphatic hydrocarbon. It is preferable to use aliphatic omega-aminocarboxylic acids having from four to twelve carbon atoms. These are mainly radicals derived from saturated aliphatic hydrocarbons.

Dicarboxylic acids for preparation of the structural units described of formulae I and II are aliphatic and/or cycloaliphatic dicarboxylic acids, and in the case of the structural units of the formula II also aromatic dicarboxylic acids, of low molecular weights, usually below 300.

The expression "dicarboxylic acids" also encompasses their polyester-forming derivatives, such as the halides, esters, or anhydrides of dicarboxylic acids.

For the purposes of this invention, "aliphatic or cycloaliphatic dicarboxylic acids" are carboxylic acids which have two carboxy groups which have been bonded to different carbon atoms of an aliphatic or cycloaliphatic hydrocarbon. Alongside ethylenically unsaturated dicarboxylic acids, such as maleic acid, saturated dicarboxylic acids are in particular used.

For the purposes of this invention, "aromatic dicarboxylic acids" are carboxylic acids which have two carboxy groups which have been bonded to different carbon atoms of a benzene ring, which can be part of a ring system. The carboxy groups can also have been bonded to carbon atoms of different rings. A plurality of rings can have been fused to one another or can have been linked to one another via bridging groups, such as a direct carbon-carbon bond, —O—, —CH$_2$—, or —SO$_2$—.

Examples of aliphatic or cycloaliphatic dicarboxylic acids which can be used for preparation of the polyamide elastomers to be used according to the invention are sebacic acid, 1,3-cyclohexanedicarboxylic acid, 1,4-cyclohexanedicarboxylic acid, adipic acid, glutaric acid, succinic acid, carbonic acid, oxalic acid, azelaic acid, diethyldicarboxylic acid, 2-ethylsuberic acid, 2,2,3,3-tetramethylsuccinic acid, cyclopentanedicarboxylic acid, decahydro-1,5-naphthalenedicarboxylic acid, 4,4'-bicyclohexyldicarboxylic acid, decahydro-2,6-naphthalenedicarboxylic acid, 4,4'-methylenebis (cyclohexanecarboxylic acid), 3,4-furandicarboxylic acid, and 1,1-cyclobutane-dicarboxylic acid.

Preferred aliphatic carboxylic acids are sebacic acid and adipic acid.

Examples of aromatic dicarboxylic acids which can be used for preparation of the polyamide elastomers to be used according to the invention are isophthalic acid and terephthalic acid.

Particularly preferred thermoplastic polyamide elastomers used are polyetheramide elastomers which have aliphatic polyamide groups as stiff segment and polytetramethylene oxide and/or polypropylene oxide and/or polyethylene oxide as flexible segment.

Very particularly preferably used polyamide elastomers are polyetheramides based on aliphatic polyamide units, in particular on nylon-6, nylon-11, nylon-12, nylon-6,6, nylon-6,10, nylon-6,11, and nylon-6,12 as stiff segment, and on polytetramethylene oxide as flexible segment.

The hardness range of the polyamide elastomers used according to the invention is preferably from approximately Shore A 50 to approximately Shore D 75. The hardness here is also a measure of the proportion of the stiff polyamide segments with respect to the flexible polyol segments or flexible polyester segments.

The melt index of the polyamide elastomers is measured at various temperatures, as a function of the melting behavior of the stiff polyamide segments. It is also a measure of the degree of addition (molar mass of entire chains).

Conventional additives can also be present in the polyacetal and/or polyamide elastomer used according to the invention, examples being stabilizers, nucleating agents, mold-release agents, lubricants, fillers, reinforcing materials, pigments, carbon black, light stabilizers, flame retardants, antistatic agents, plasticizers, and optical brighteners. The amounts present of the additives are conventional amounts.

It has been found that modified polyacetals, in particular impact-modified polyacetals, lead to better adhesion to the softer TPEA component.

The invention therefore preferably provides the composites defined above in which the polyacetal comprises at least one modifier, preferably at least one compound selected from the group consisting of thermoplastic polyurethane elastomer, methyl methacrylate-butadiene-styrene core-shell elastomer, methyl methacrylate-acrylate core-shell elastomer, polycarbonate, styrene-acrylonitrile copolymer, and acrylate-styrene-acrylonitrile copolymer compounded material.

The invention particularly preferably provides the composites defined above in which the polyacetal has been modified with from 1 to 50% by weight of a thermoplastic polyurethane elastomer, with from 1 to 40% by weight of a methyl methacrylate-butadiene-styrene core-shell elastomer, or with a mixture of the two, the entirety of the two modifiers being in the range from 1 to 50% by weight.

The invention provides not only a composite composed of polyacetal and of at least one thermoplastic polyamide elastomer but also a process for its production, where a molding composed of polyacetal is first molded, onto which then a coating or at least one molding composed of the polyamide elastomer is injected, the polyacetal bonding cohesively or adhesively to the polyamide elastomer.

The inventive composite here is formed by a polyacetal molding which has been partially or completely coated with the thermoplastic polyamide elastomer or onto which one or more moldings, also called functional parts, composed of the thermoplastic polyamide elastomer have been directly molded. By way of example, this can be a flat polyacetal molding which bears on one side a layer composed of thermoplastic polyamide elastomer. Examples of this are antislip substrates, grip recesses, operating units and switching units, functional parts provided with gaskets or with damping elements, and also interior and exterior cladding on two-wheeled vehicles, on other motor vehicles, on aircraft, on rail vehicles, and on watercraft, where by virtue of the polyacetal these have the required dimensional stability and by virtue of the polyamide elastomer layer they have the desired frictional property, sealing function, feel or appearance.

However, the composite can also be composed of one or more polyacetal moldings of any desired shape, onto which one or more moldings of any desired shape composed of the thermoplastic polyamide elastomer have been directly molded. For the purposes of the present invention, the expression "directly molded on" is intended to mean that the functional elements have been directly injected onto the molding composed of polyacetal with which they are intended to enter into secure adhesive bonding, in a multicomponent injection molding process.

By virtue of the use of the thermoplastic polyamide elastomers it is possible, by way of example, for sealing elements or damping elements composed of the elastomers to be directly molded onto the moldings composed of polyacetal, with no requirement for any other assembly steps.

A considerable cost saving in the production of the inventive composites can be achieved via the omission of the processing steps needed hitherto for the assembly of functional elements.

The inventive composite is produced by the well-known multicomponent injection molding process, where first the polyacetal is molded in the injection mold, i.e. is injected first, and then a coating or molding composed of the thermoplastic polyamide elastomer is injected onto the polyacetal molding.

The invention also provides a process for production of the abovementioned composite, where multicomponent injection molding processes are used to mold at least one polyacetal molding and at least one other molding composed of thermoplastic polyamide elastomer onto one another, the polyamide elastomer being injected onto the polyacetal molding.

When the molding is manufactured, the melt temperature here is in the conventional range, i.e. for the polyacetals described above is in the range from about 180 to 240° C., preferably from 190 to 230° C. The mold itself is preferably temperature-controlled to a temperature in the range from 20 to 140° C. A mold temperature in the above temperature range is advantageous for the precision of molding and dimensional stability of the hard component composed of polyacetal, which is a semicrystalline material.

As soon as the cavity in the mold has been filled completely and the hold pressure has no further effect (gate-sealing point), the polyacetal molding can be subjected to full and final cooling and can be demolded as the first part of the composite (premolding). In a second, subsequent separate injection molding step, by way of example, this premolding is then inserted or transferred into another mold whose cavity has additional space, and the material with the lower hardness, i.e. the thermoplastic polyamide elastomer, is injected into the mold and thus injected onto the polyacetal molding. This process is known as the insert process or transfer process. With respect to the adhesion subsequently achievable, it is particularly advantageous for the polyacetal molding first injection-molded to be preheated to a temperature in the range from 80° C. to just below the melting point. This facilitates incipient melting of the surface via the thermoplastic polyamide elastomer injected onto the material and penetration of this elastomer into the interface layer.

However, in another possible method the polyacetal molding first injection-molded is only partially demolded and is moved together with a portion of the original mold (e.g. the feed plate, the ejector half, or just one indexing plate) into another larger cavity.

Another possible method consists in injecting the thermoplastic polyamide elastomer into the same mold, without intermediate opening of the machine and onward transport of the premolding composed of polyacetal. Here, the mold cavities intended for the polyamide elastomer component are initially sealed via displaceable inserts or cores during injection of the polyacetal component, and are not opened until the polyamide elastomer component is injected (split technique). This version of the process is also particularly advantageous for achieving good adhesion, since the melt of the polyamide elastomer encounters a premolding which is still hot, after only a short cooling time.

If appropriate, further moldings composed of polyacetal and of the thermoplastic polyamide elastomer can be applied by injection molding simultaneously or in sequential steps by the multicomponent injection molding process.

When the thermoplastic polyamide elastomer is applied by injection molding, for good adhesion it is advantageous to select maximum possible settings for the melt temperature. The melt temperature of the thermoplastic polyamide elastomer is generally in the range from 200 to 320° C., with an upward limit imposed by its decomposition. The values for injection rate and also for injection pressure and hold pressure are machine- and molding-dependent and are to be matched to the particular circumstances.

In all of the versions of the process, with or without demolding of the premolding, the mold is temperature-controlled in the second step to a temperature in a range which is preferably from 20° C. to 140° C. As a function of the structure of the parts, it can be advisable to lower the mold temperature somewhat, in order to optimize demoldability and cycle times. Once the parts have cooled, the composite is demolded. An important factor here related to the design of the mold is to attach the ejectors at a suitable site which minimizes the loading on the bonded joint of the materials. Sufficient venting of the cavity in the joint region is also to be provided in the design of the mold, in order to minimize inhibition of bonding between the two components via included air. A similar effect results from the nature of the roughness of the mold wall. For development of good adhesion, the surface at the site of the bonded joint is advantageously smooth, since less air is then included in the surface.

The components in the inventive process have different hardness. The inventive composites are used as bonding elements in the form of fittings, couplings, rollers, bearings, or as functional parts with integrated sealing properties and/or with integrated damping properties, or else as non-slip and easy-grip elements. Among these are in particular housings used in automobile construction, such as door closure housings, window lifter housings, or sliding-roof sealing elements, and also fastening elements with an integrated seal, such as clips with sealing rings or with sealing disks, decorative strips with an integrated sealing lip, sealing elements for compensation in expansion joints, fastening elements with good damping properties, e.g. clips with cores for damping of vibration or of noise, power train components, such as gearwheels with damping elements, gearboxes with integrated flexible couplings, non-slip, easy-grip elements, such as control levels or control knobs, or grip surfaces on electrical devices or on writing implements, and also chain links with a resilient surface.

The adhesion between the hard polyacetal component and the soft, thermoplastic polyamide elastomer component can be determined by means of a test method described in WO-A-99/16,605.

The examples below illustrate, but do not restrict, the invention.

EXAMPLES 1-12

The injection molding experiments used a three-component injection molding machine with locking force of 2000 kN (FM 175/200, manufactured by Klöckner Ferromatik, Malterdingen, Federal Republic of Germany). From the three screws available, an assembly whose diameter was 45 mm was selected for use. In a cavity closed on one side, modified ISO tensile specimens were first premolded with one shoulder composed of material 1. For the polyacetal grades used, melt temperature was 200° C. and mold temperature was 80° C.

The resultant halved tensile specimens composed of polyacetal were preheated in a heating cabinet with air circulation at a temperature $T_{ins}$ of 155° C. and were placed while still hot, within about 20 sec, into the fully open tensile specimen mold. In a second injection molding operation, material 2 was injected into the tensile specimen mold at various melt temperatures $T_{me}$ and mold temperatures $T_{mo}$ at different injection rates $v_i$. Different hold pressures $p_a$ and hold pressure times tpa were used.

The resultant tensile specimens composed of two components were tested by the ISO 527 tensile test, using a separation velocity of 50 mm/min. The result of the tensile test was used to determine the tensile strength of the specimens at break at the jointing seam (bond strength) and the associated tensile strain at break. Ten tensile specimens were tested in each test. The values obtained for the 10 test specimens were averaged.

The table below lists the details of conduct of the tests and the results thus obtained.

| Ex. No. | Material 1[1)–3)] | Material 2[4)] | $T_{me}$ (° C.) | $T_{mo}$ (° C.) | $p_a$ (bar) | tpa (sec) | $v_i$ (mm/sec) | Bond strength (N/mm$^2$) | Tensile strain at break (%) |
|---|---|---|---|---|---|---|---|---|---|
| 1 | S 9064 | Pebax S 2533 SN01 | 240 | 60 | 50 | 40 | 100 | 2.3 | 11.6 |
| 2 | S 9064 | Pebax S 2533 SN01 | 250 | 60 | 50 | 40 | 100 | 2.5 | 13.5 |
| 3 | C 9021 | Pebax S 2533 SN01[5)] | 250 | 60 | 50 | 40 | 100 | 0.9 | 2.6 |
| 4 | S 9244 | Pebax S 2533 SN01[5)] | 250 | 60 | 50 | 40 | 100 | 1.7 | 7.0 |
| 5[5)] | S 9064 | Pebax S 2533 SN01 | 250 | 60 | 50 | 40 | 100 | 1.5 | 4.6 |
| 6[6)] | S 9064 | Pebax S 2533 SN01 | 250 | 60 | 50 | 40 | 100 | 1.7 | 6.1 |
| 7 | S 9064 | Pebax S 2533 SN01 | 250 | 80 | 50 | 40 | 100 | 2.3 | 14.6 |
| 8 | S 9064 | Pebax S 2533 SN01 | 260 | 80 | 50 | 40 | 100 | 2.0 | 12.4 |
| 9 | S 9064 | Pebax S 2533 SN01 | 260 | 60 | 50 | 40 | 100 | 2.1 | 10.8 |
| 10 | S 9064 | Pebax S 2533 SN01 | 270 | 60 | 50 | 40 | 100 | 1.7 | 8.1 |

| Ex. No. | Material 1[1)–3)] | Material 2[4)] | $T_{me}$ (°C.) | $T_{mo}$ (°C.) | $p_a$ (bar) | tpa (sec) | $v_i$ (mm/sec) | Bond strength (N/mm$^2$) | Tensile strain at break (%) |
|---|---|---|---|---|---|---|---|---|---|
| 11 | S 9064 | Pebax S 2533 SN01 | 280 | 60 | 50 | 40 | 100 | 1.3 | 5.8 |
| 12 | S 9064 | Pebax S 2533 SN01 | 290 | 60 | 50 | 40 | 100 | no adhesion | no adhesion |

[1)]Hostaform ® C 9021: polyoxymethylene copolymer composed of trioxane and about 2% by weight of ethylene oxide, MF melt index 190/2.16 (ISO 1133): 9 g/10 min, no modification (Ticona GmbH)
[2)]Hostaform ® S 9064: polyoxymethylene copolymer composed of trioxane and about 2% by weight of ethylene oxide, MF melt index 190/2.16 (ISO 1133): 9 g/10 min, modification: 20% by weight of thermoplastic polyurethane (Ticona GmbH)
[3)]Hostaform ® C 9244: polyoxymethylene copolymer composed of trioxane and about 2% by weight of ethylene oxide, MF melt index 190/2.16 (ISO 1133): 9 g/10 min, modification: 25% by weight of MBS core-shell modifier composed of about 80% by weight of elastic polybutadiene core and about 20% by weight of MMA/styrene shell with particle size of about 100 nm (Ticona GmbH)
[4)]Pebax ® S 2533 SN01: polyetheramide elastomer (Atochem)
[5)]$T_{ins}$ = room temperature
[6)]$T_{ins}$ = 100° C.

The invention claimed is:

1. A composite comprising a polyacetal component and a thermoplastic polyamide elastomer component directly molded onto the polyacetal component,
the polyacetal component consisting of
polyacetal,
optionally at least one modifier selected from the group consisting of methyl methacrylate-butadiene-styrene core-shell elastomer, and methyl methacrylate-acrylate core-shell elastomer,
optionally, one or more additives selected from the group consisting of glass fibers, and carbon black,
the thermoplastic polyamide elastomer component consisting essentially of at least one thermoplastic polyamide elastomer, wherein the thermoplastic polyamide elastomer is a multiblock copolymer consisting of polyamide segments and either polyether segments or polyester segments, the multiblock copolymer consisting of the repeat structural units of the formulae I and II or of the formulae I and III or of the formulae I, II, and III, which have been linked to one another via ester bonds and/or amide bonds

$$—[O—R^1—O—[CO—R^2—[CO]_q]_m]_n— \quad (I),$$

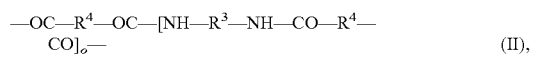

$$—OC—R^4—OC—[NH—R^3—NH—CO—R^4—CO]_o— \quad (II),$$

$$[—NH—R^5—CO]_p— \quad (III),$$

where $R^1$, $R^2$, and $R^3$, independently of one another, are alkylene or cycloalkylene radicals,
where $R^4$ and $R^5$, independently of one another, are alkylene, cycloalkylene, or arylene radicals,
m and q, independently of one another, are 0 or 1, and
n, o, and p, independently of one another, are whole numbers at least equal to 1,
the composite being formed by forming a molding of the polyacetal component and overmolding one or more moldings composed of the thermoplastic polyamide elastomer component immediately adjacent to the polyacetal component, wherein the polyacetal component and the thermoplastic polyamide elastomer component have been bonded adhesively or cohesively to one another via injection of the thermoplastic polyamide elastomer component onto the polyacetal molding, which prior to the molding-on of the thermoplastic polyamide elastomer component, is preheated to a temperature in the range from 80° C. to just below its melting point, and the melt temperature of the thermoplastic polyamide elastomer component during the process of molding onto the polyacetal molding is from 200 to 280° C. and wherein the tensile bond strength between the polyacetal component and the thermoplastic polyamide elastomer component is at least 0.5 N/mm$^2$ determined in the tensile test to ISO 527.

2. The composite as claimed in claim 1, wherein the tensile bond strength between the polyacetal component and the thermoplastic polyamide elastomer component is at least 1.0 N/mm.

3. The composite as claimed in claim 1, wherein the polyacetal comprises a polyoxymethylene copolymer.

4. The composite as claimed in claim 1, wherein the thermoplastic polyamide elastomer component has additives that are selected from the group consisting of stabilizers, nucleating agents, impact modifiers, mold-release agents, lubricants, fillers, reinforcing materials, pigments, carbon black, light stabilizers, flame retardants, antistatic agents, plasticizers, and optical brighteners.

5. The composite as claimed in claim 1, wherein the hardness of the thermoplastic polyamide elastomer component is in the range from Shore A 50 to Shore D 75.

6. The composite as claimed in claim 1, wherein the thermoplastic polyamide elastomer comprises a thermoplastic polyetheramide elastomer.

7. The composite as claimed in claim 6, wherein the thermoplastic polyetheramide elastomer has aliphatic polyamide groups as stiff segment and polytetramethylene oxide and/or polypropylene oxide and/or polyethylene oxide as flexible segment.

8. The composite as claimed in claim 7, wherein the aliphatic polyamide groups are selected from the group consisting of nylon-6, nylon-11, nylon-12, nylon-6,6, nylon-6,10, nylon-6,11, and nylon-6,12.

9. The composite as claimed in claim 1, wherein the polyacetal molding has been completely coated with the thermoplastic polyamide elastomer component.

10. A connector or a component with integrated sealing properties and/or with integrated damping properties, or else as non-slip and easy-grip element which comprises the composite as claimed in claim 1.

* * * * *